No. 820,274. PATENTED MAY 8, 1906.
W. M. B. WATLEY.
HAND TRUCK.
APPLICATION FILED AUG. 29, 1905.
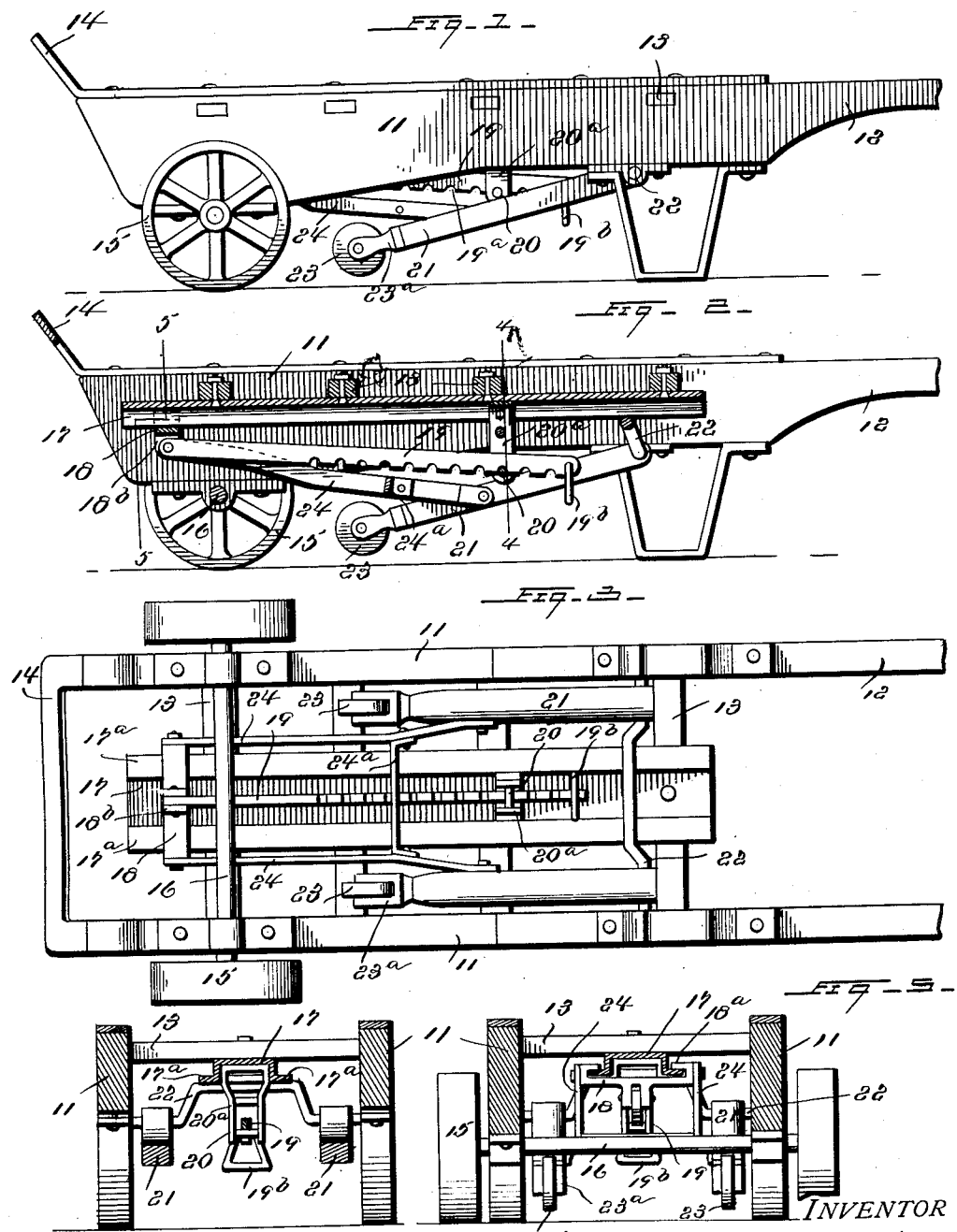
WITNESSES: INVENTOR
Willis M. B. Watley.
By Milo B. Stevens & Co.
Attorneys

UNITED STATES PATENT OFFICE.

WILLIS M. B. WATLEY, OF CHICAGO, ILLINOIS.

HAND-TRUCK.

No. 820,274.   Specification of Letters Patent.   Patented May 8, 1906.

Application filed August 29, 1905. Serial No. 276,237.

*To all whom it may concern:*

Be it known that I, WILLIS M. B. WATLEY, a citizen of the United States, residing at Chicago, in the county of Cook and State of Illinois, have invented new and useful Improvements in Hand-Trucks, of which the following is a specification.

This invention is a device which is added to an ordinary two-wheel hand-truck; and it consists of an auxiliary pair of wheels mounted on means for adjusting the said wheels in various positions, so as to provide a truck with four wheels with the truck at various angles or so as to simply have the truck with two wheels and the additional wheels out of action. This is only done when the truck is lightly loaded, the object of the extra wheel being to support heavy loads.

In the accompanying drawings, Figure 1 is a side view of the truck. Fig. 2 is a longitudinal section of the same. Fig. 3 is an inverted plan view of the truck. Figs. 4 and 5 are cross-sections on the lines 4 4 and 5 5 of Fig. 2.

Referring specifically to the drawings, the frame of the truck has the usual sides 11, with handles 12, cross-pieces 13, and toe-piece 14. 15 represents the wheels, having an axle 16. These parts mentioned are common to trucks, 17 is a central channel-piece having side flanges 17$^a$, which forms a guideway for a sliding head 18. The channel-piece 17 is attached to the cross-pieces 13 in any suitable way and extends lengthwise of the truck. The head 18 has lips 18$^a$, which engage the flanges 17$^a$ of the guideway, and lugs 18$^b$, to which is connected an adjusting-bar 19, provided with notches 19$^a$, any one of which engages a cross piece or rod 20 on a fixed bracket 20$^a$, secured to the frame of the truck.

19$^b$ is a handle for adjusting the bar 19 so as to move it out of engagement with the cross-piece 20 and shift it to insert any desired notch in engagement with same.

21 represents two side bars attached pivotally to a cross-rod 22. Each of the side bars has a small wheel 23, attached by a pivoted bracket 23$^a$ to the same. Attached to the side bars are two connecting-bars 24, which are connected at their lower ends to the sliding head 18. 24$^a$ is a cross-piece for strengthening the bars 24.

As shown in Figs. 1 and 2, the wheels 23 or auxiliary wheels are not in use. By moving the adjusting-bar 19 lengthwise one way or the other these wheels may be put into any desired position, so that the truck will be supported on four wheels. This is especially useful when the truck is heavily loaded, thus relieving the workman to a great extent in supporting the load.

What I claim as new, and desire to secure by Letters Patent, is—

The combination with a hand-truck, of a pair of swinging side bars pivoted at one end thereto and carrying rollers at their free ends, a head sliding in guides on the frame of the truck and connected to the bars, and a notched adjusting-bar connected to the head and engageable with the truck, to hold the arms and rollers in extended or retracted position.

In testimony whereof I have signed my name to this specification in the presence of two subscribing witnesses.

WILLIS M. B. WATLEY.

Witnesses:
CLARA PROSCHE,
H. G. BATCHELOR.